United States Patent [19]

Rightmyre

[11] Patent Number: 4,944,586

[45] Date of Patent: Jul. 31, 1990

[54] AUTOMATED TRANSPARENCY ORGANIZER

[75] Inventor: Bruce M. Rightmyre, Wilmington, Del.

[73] Assignee: E. I. Du Pont de Nemours and Company, Wilmington, Del.

[21] Appl. No.: 444,000

[22] Filed: Nov. 30, 1989

[51] Int. Cl.$^5$ .............................................. G03B 23/10
[52] U.S. Cl. .............................. 353/108; 353/DIG. 5; 353/DIG. 3; 353/120
[58] Field of Search ................ 353/DIG. 2, DIG. 3, 353/DIG. 5, 120, 121, 122, 26 R, 26 A, 108, 109

[56] References Cited

U.S. PATENT DOCUMENTS 3,317,151 5/1967 Wright .......................... 353/DIG. 5

FOREIGN PATENT DOCUMENTS

| 230036 | 11/1958 | Australia | 353/103 |
| 3439923 | 5/1985 | Fed. Rep. of Germany | 353/DIG. 3 |
| 0031126 | 2/1985 | Japan | 353/108 |
| 0258437 | 11/1987 | Japan | 353/DIG. 5 |
| 1431542 | 4/1976 | United Kingdom | 353/DIG. 5 |

*Primary Examiner*—Harry N. Haroian

[57] ABSTRACT

A cassette web transport mechanism is placed upon an overhead image projector. Multiple overhead projector slides are conveniently secured in a roll of the web. The web is moved in forward or reverse direction by remote control in order to display the desired slide through the projector.

2 Claims, 5 Drawing Sheets 4,944,586

AUTOMATED TRANSPARENCY ORGANIZER

BACKGROUND OF THE INVENTION

1. Field of the Invention

This invention relates to overhead projectors, and, more particularly, to means for storing and automatically displaying overhead transparencies in a conveniently demountable apparatus.

2. Description of the Prior Art

Transparencies used with an overhead projector are usually handled manually, even though it is distracting to both the audience and speaker when attention is continually diverted to keeping the transparencies organized and positioned accurately within the projection window. The term "transparency" here is meant to include "overheads" and other transparent viewable media such as x-ray film and the like.

An infrequent speaker often finds it difficult and cumbersome to manage a set of loose transparencies during the course of a presentation. Usually the speaker will stand in front of the room to operate the overhead projector; the projector's limited focusing range provides minimal flexibility in locating the projector any great distance from the screen. In this typical arrangement, the mobility of the speaker is also limited as she either stands and pivots with her back to the audience, or a good portion of it, to facilitate the transfer from one overhead to the next. Also, because the speaker is generally "tied" to the overhead projector, she often blocks the view of some portion of the audience.

The problems with this arrangement are compounded when the speaker desires to return to an earlier shown transparency for further clarification or to provide additional information on a particular point. The transparencies tend to retain static charge and are now likely disorganized on the table or stand which frustrate her attempts at a deft, impromptu review of an earlier-described topic.

It is an object of the present invention to provide an apparatus for viewing transparencies on a overhead projector which obviates one or more of the problems found in the prior art.

It is another object of the invention to provide an apparatus for storing transparencies which may be used directly on an overhead projector stage to view the transparencies.

It is a further object of the invention to provide a transparency storage and viewing apparatus which is compact and easily portable.

It is a still further object of this invention to provide an apparatus for viewing transparencies which adaptably attaches to the light boxes of variously sized overhead projectors and remains stationary during use.

It is an additional object of the invention to provide an apparatus which can hold several transparencies in an aligned configuration so that two or more transparencies can be overlaid for viewing without interfering with the normal viewing operation.

It is also an object of the invention to provide an apparatus of the type described which is convenient and reliable in use, yet relatively inexpensive and simple in construction.

It is an object of this invention to include a simple transparency feeding mechanism which provides for automatic transparency changing by remote control and reduces the relative immobility of the speaker.

It is moreover an object of this invention to reduce screen glare that affects readability of the transparency.

It is a further object of this invention to provide a reloadable film carrier onto which the ordered transparencies would be attachable.

It is a still further object of this invention to provide a reloadable cartridge to accept the film It is also an object of this invention to provide a frame counter for ease of access to a desired transparency.

SUMMARY OF THE INVENTION

The present invention provides a conveniently demountable apparatus, for use in conjunction with an overhead projector, for storing and automatically displaying overhead transparencies comprising:

a. a web means having at least one transparent section thereon;

b. means for holding at least one overhead transparency on said web means over said transparent section;

c. cassette means for positioning said web in proper alignment over said overhead projector;

d. means for driving said web and said transparencies mounted thereon in said cassette means over the active projecting area of said overhead projector.

DETAILED DESCRIPTION OF THE INVENTION

Figure 7:
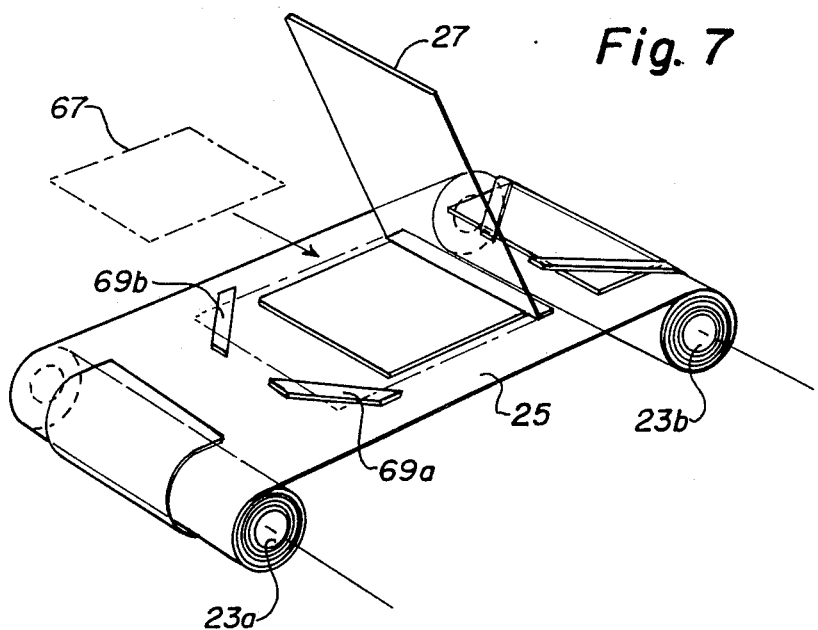
FIG. 7 is a perspective view of the preferred embodiment of the film carrier scroll onto which the transparency is placed and covered by an overlay leaf which tucks under two strips on top of the film carrier.

Referring now to the drawing, in preparing a talk to include overhead transparencies, a transparency 67 (FIG. 7) is placed onto a transparent polymeric film sheet 25 (hereinafter called film carrier) in either horizontal or vertical orientation, according to the user's preference, for viewing. An transparent overleaf attached on one edge to the film carrier 25 is lowered to cover the transparency 67. The two corners of the overleaf opposite the edge attached to the film carrier are tucked under corner strips 69a and 69b to hold the transparency in place between the overleaf and the film carrier. The transparent overleaf and/or the film carrier may be optionally tinted to reduce onscreen glare as required.

Said film carrier is attached at opposite ends of its length to rigid spool cores 49a and 49b so that the assembled arrangement is similar to a scroll. Each of the spool cores is identical, having one end circular and smooth and the opposite end fitted with toothed gear wheels 47a and 47b, respectively. The gear wheels each have a smooth neck portion extending into the bores of the spools. Circular spool plugs 23a and 23b cover the smooth ends of spool cores 49a and 49b. Donut shaped spool end caps 24a and 24b fit over the spool plugs and protect the edges of the film carrier 25 and maintain its alignment during subsequent system operation. On the spool ends having toothed gear wheels 47a and 47b, donut shaped end caps 51a and 51b are placed over the spool ends, however, the center portions of the spool ends containing the gear wheels remains exposed.

Said scroll arrangement is placed inside an inner cassette frame 29, such that spool plugs 23a and 23b fit inside bushings 9a and 9b. The fit is sufficiently loose to allow rotation of the spools in the bushings, which act as bearings, but sufficiently snug to guide the turning of the spools. The opposite ends of the spools, having toothed gear wheels, are respectively pressed between forked flexible tines 21a and 21b. The necks of the toothed gear wheels 47a and 47b snap down between the flexible tines, allowing the spools to fit into their respective cavities within inner cassette frame 29. The necks are of sufficient diameter to squeeze comfortably between the tines and guide the rotation spools in subsequent system operation without binding.

Roller bars 53a and 53b, over which the film carrier is draped, extend the width of the inner frame and also assist in the free travel of the film carrier during system operation.

Inner cassette frame 29 is made of a light weight material (plastic, aluminum or the like) and can be made telescoping along its longitudinal axis and placed in a carrying case to enable the user to take it conveniently, pre-loaded with a film carrier 25, to a meeting.

Figure 4:
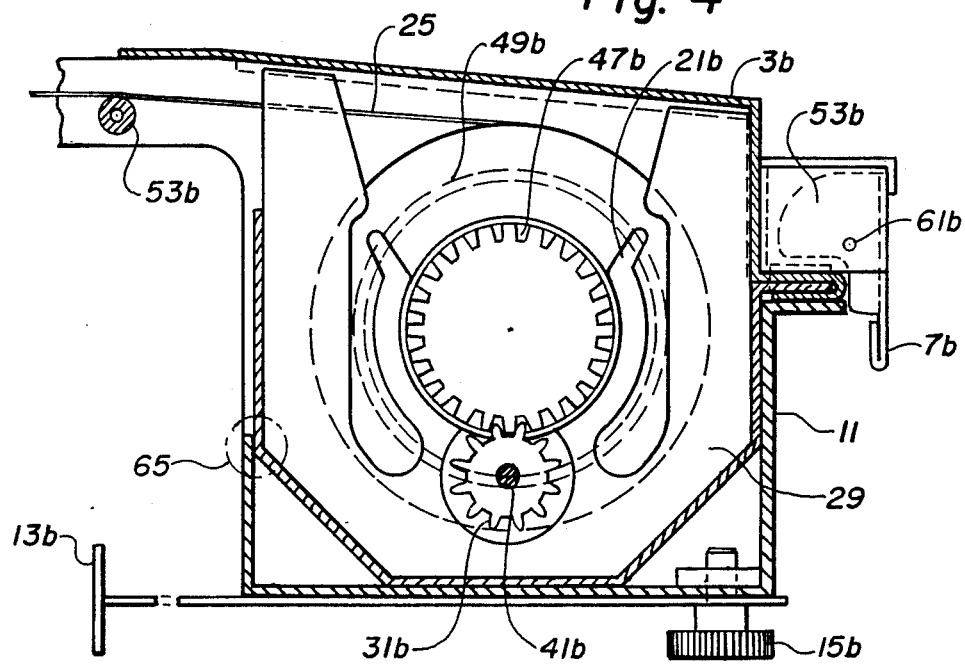
FIG. 4 is a cross sectional view taken along the line 4—4 of FIG. 3 which illustrates how the scroll engages with the rotor clutch motor driving gear.
Figure 5:
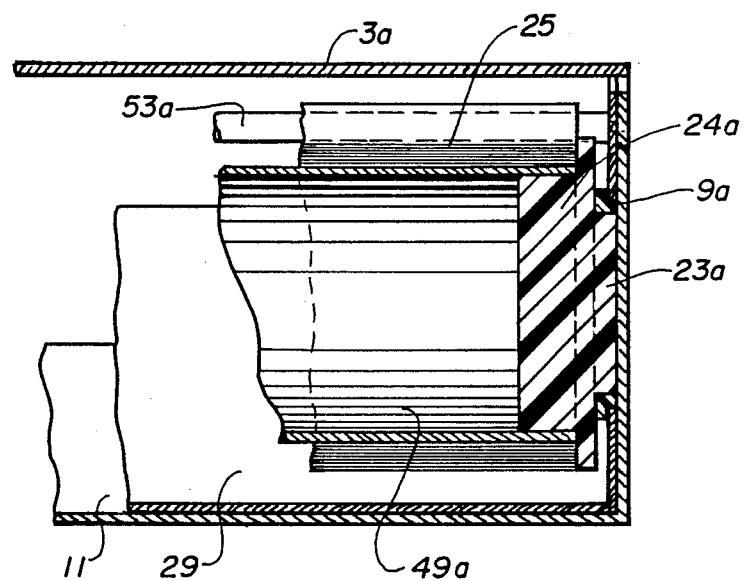
FIG. 5 is a sectional view taken along the line 5—5 of FIG. 1 showing how the non-drive end of the scroll mounts into a simple bushing.
Figure 6:
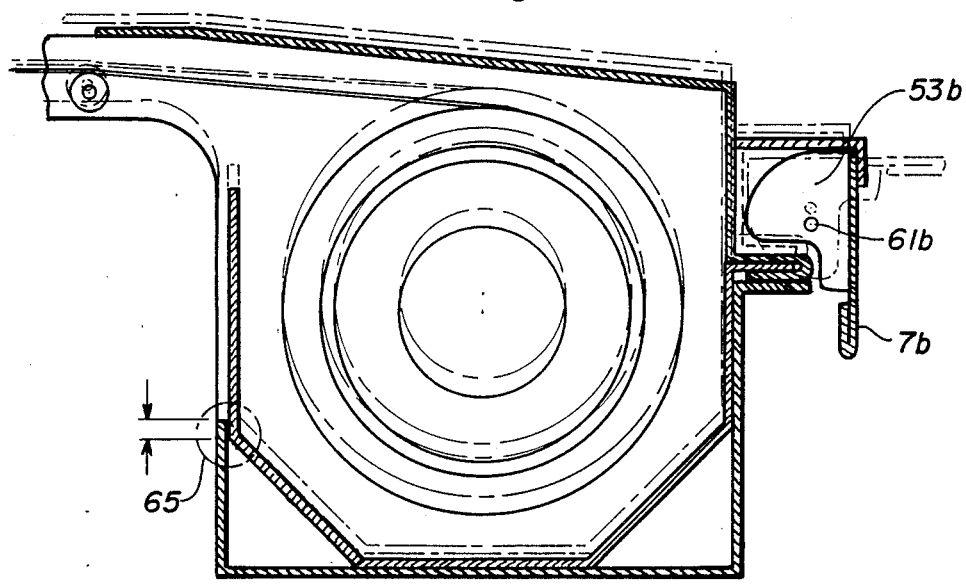
FIG. 6, similar to FIG. 4, depicts the result of raising the handle to turn the cam and disengage the cassette cover from the inner cassette frame.

Said inner cassette frame 29 is press fit into an outer cassette frame 11, having a forward and rearward portion, such that toothed gear wheels 47a and 47b are aligned with forward and reverse rotor clutch motor gears 31a and 31b, respectively, located in rearward portion of the outer cassette frame. An area of press fit between inner and outer cassette frames is shown in assembled view FIG. 4 at 65. Horizontal ledges 59a and 59b, each having a width greater than the center sections of horizontal flanges 57a and 57b, are located directly beneath the horizontal flanges, such that the horizontal ledges are visible when looking through slots in the horizontal flanges.

Cassette covers 3a and 3b slide onto horizontal ledges 59a and 59b respectively, at U-shaped portions 5a and 5b located along bottom sections of the covers. The U-shaped portions of 5a and 5b are discontinuous beneath cam release handles 7a and 7b, where only an upper flange of the U-shaped portions is present onto which the cam release handles are fixed. The U-shaped portions contain slots which align with slots on horizontal ledges 59a and 59b. When cam release handles are raised, cams 55a and 55b pivot about cam pivots 61a and 61b. The rotating cams continue through slots in the U-shaped portions and mating slots in horizontal ledges and onto the horizontal flanges 31a and 31b, respectively. Such action separates the inner cassette frame from the outer cassette frame to allow removal when required.

Located on the outside rearward face of the outer cassette frame are forward and reverse rotor clutch motors 35 and 37. Each motor contains an electric motor (39a and 39b) and pinion (45a and 45b) which engages an internal gear wheel (41a and 41b) when current energizes the electric motor. Drive shafts 43a and 43b connect the internal gear wheels with the forward and reverse rotor clutch motor drive gears 31a and 31b located on the interior face of the rearward portion of the outer cassette frame. Wires 17 and 19 lead from receiver 75 to the forward and reverse rotor clutch motors, respectively. Receiver 75 is plugged into a 115 a/c outlet to receive it operating power.

A hand held remote control device 63 is used to index the film carrier 25 to a desired location. A frame counter arrangement (not shown) can be installed by well-known means (e.g. a black spot at each sequential location along the top of the film carrier and a photodetector) to indicate when each frame is centered in the projection window. In the preferred embodiment, the remote sends an electromagnetic signal to receiver 75, though infrared, audible tones or other signal types may used. The signal's frequency is distinguished by the receiver which allows current to flow to the appropriate motor for advancing of reversing the film carrier as the user has indicated with the remote. The pinion 45 is disengaged from internal gear wheel 41 in the rotor clutch motor not activated by the user. Therefore, when the forward rotor clutch motor is energized and driving forward, the reverse rotor clutch motor is freewheeling to allow the film carrier to travel easily in the desired direction.

Additional transparencies may be sequentially loaded by indexing the film carrier to successive locations in the above described manner. After all of the transparencies have been loaded, the remote may be used to reverse the film carrier in preparation for the presentation.

Figure 1:
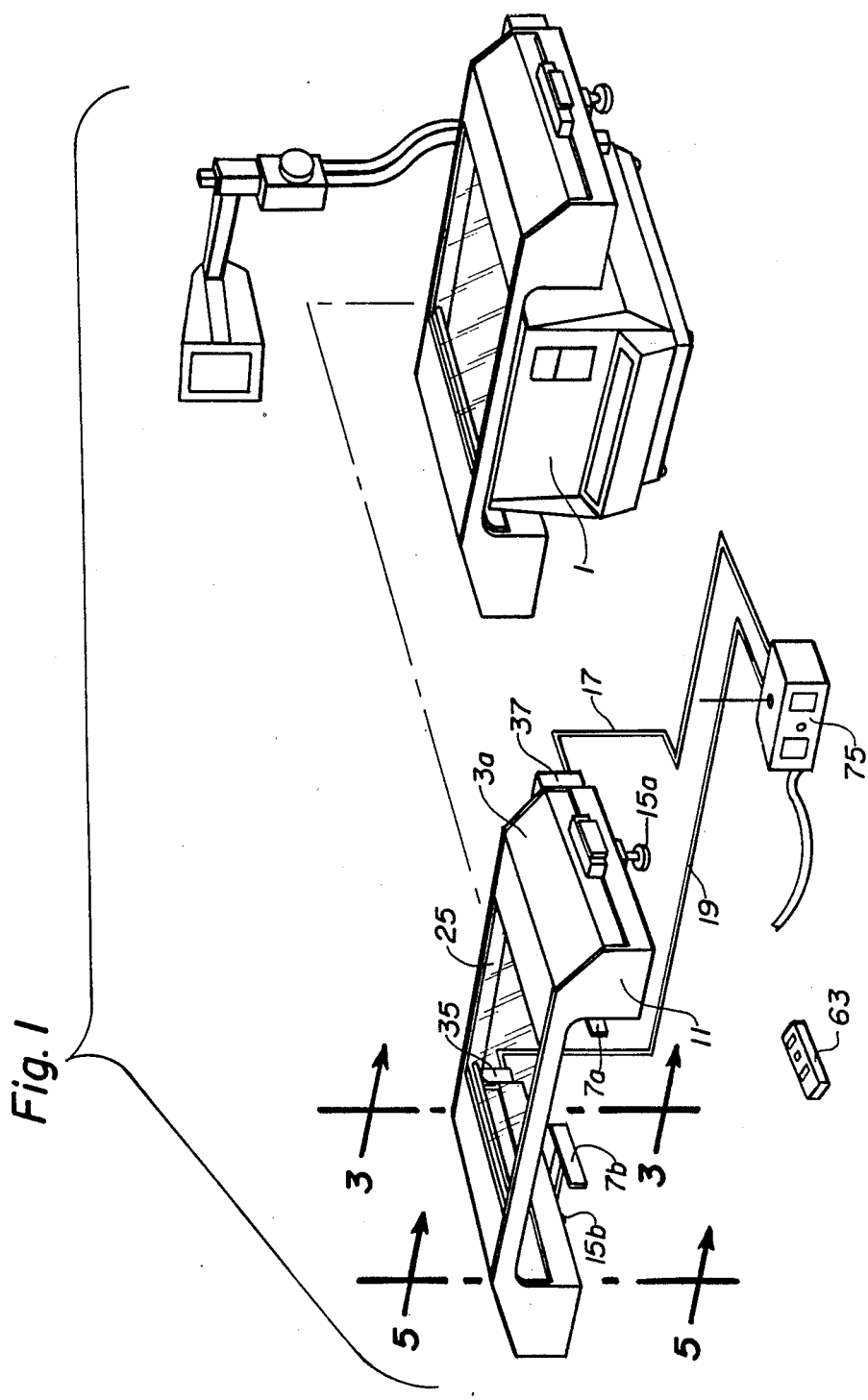
FIG. 1 depicts the instant invention and its operative relationship to an overhead projector.
Figure 2:
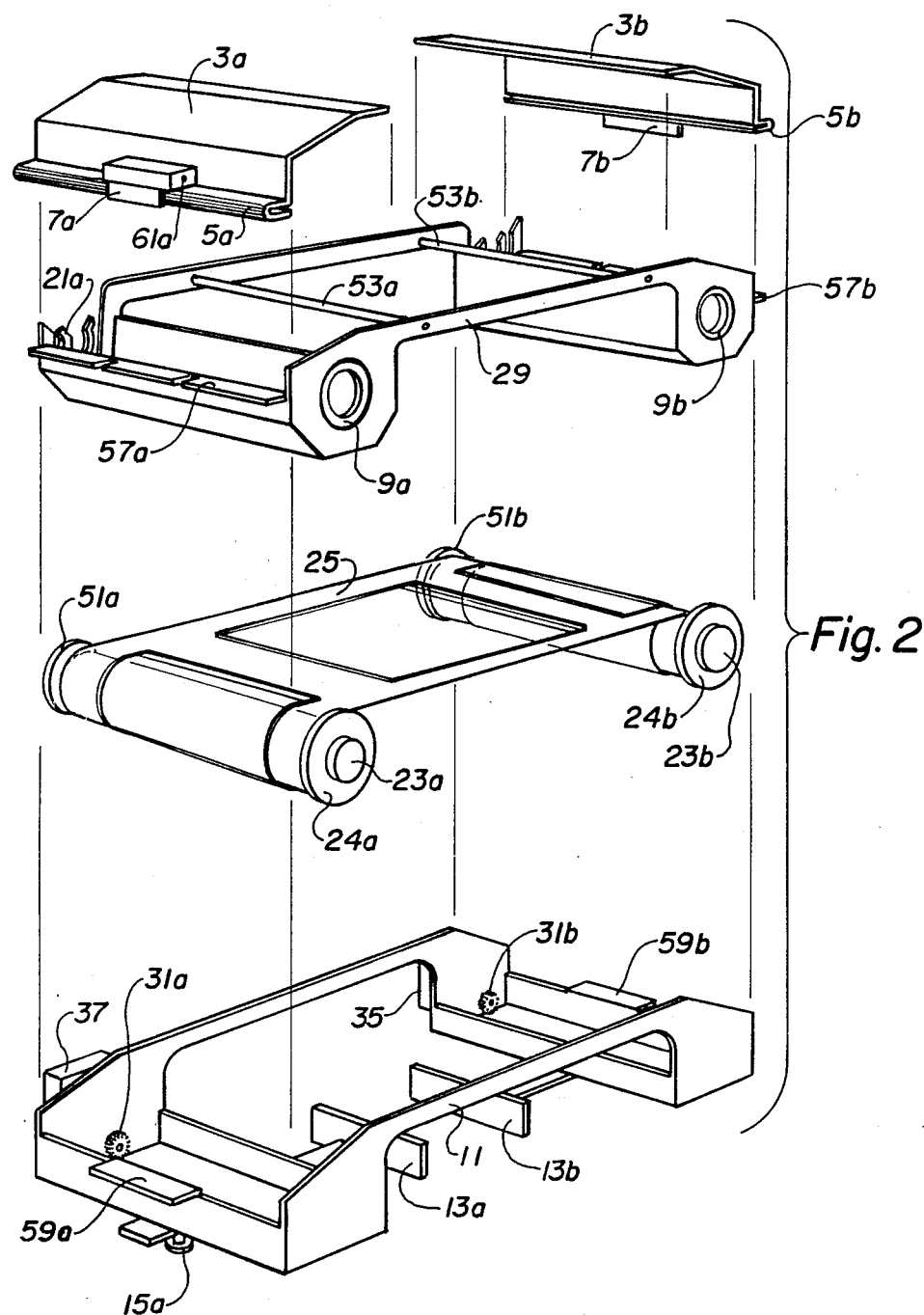
FIG. 2 is an exploded view of the instant invention shown in the assembled state in FIG. 1.
Figure 3:
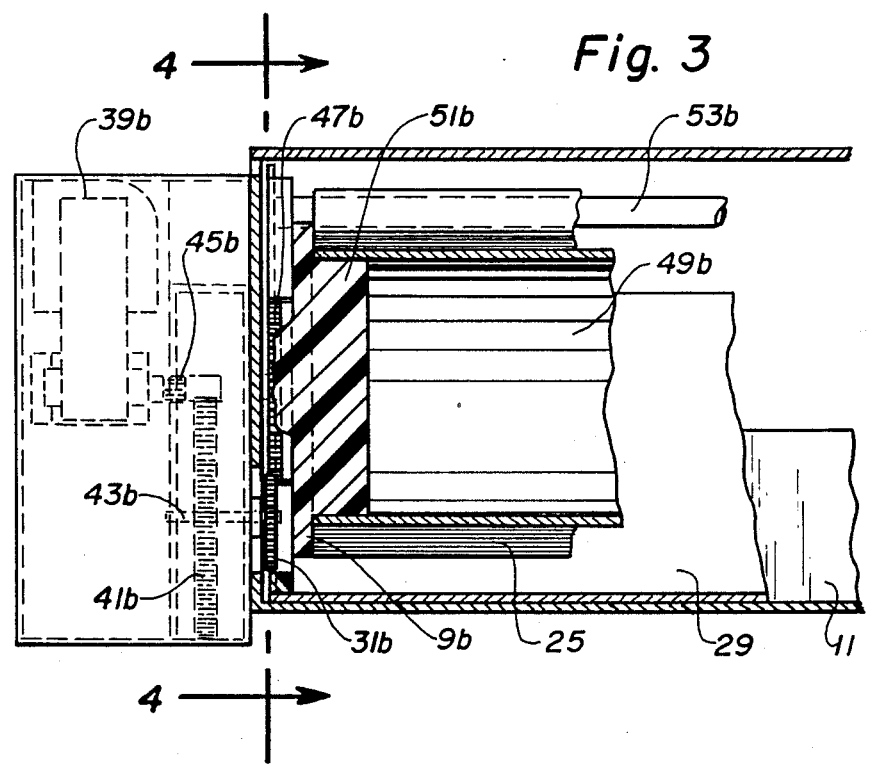
FIG. 3 is a fragmentary sectional view taken along the line 3—3 of FIG. 1 showing the rotor clutch motor drive connection through the cassette wall to the scroll spool.

The Automated Transparency Organizer, thus loaded, may be positioned astride overhead projector 1 in a saddle type configuration (FIG. 1). The term "overhead projector" is meant to include all projectors using large illumination areas on which a transparency is projected onto a wall or screen. Foot clamps 13a and 13b are slideably adjusted to provide the necessary stability for the apparatus, in case the Automatic Transparency Organizer is bumped in the course of use. Thumb screws 15a and 15b are used to tighten the foot clamps against the overhead projector. The adjustable clamps also make it possible for the Automatic Transparency Organizer to fit adaptably to a variety of overhead projector manufacturers' products.

Figure 8:
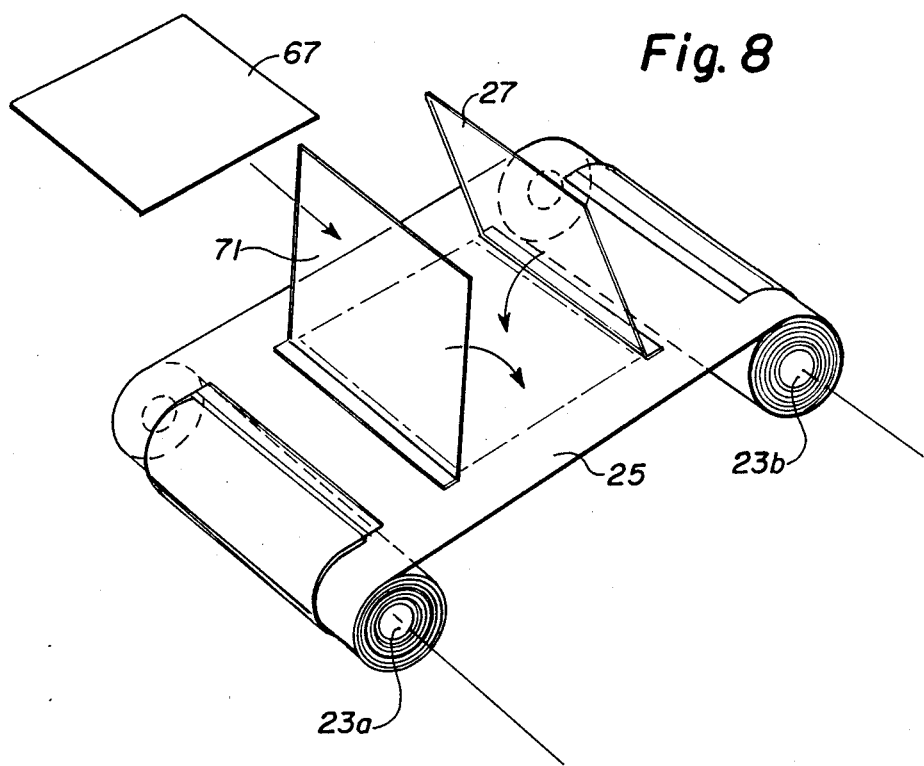
FIG. 8 is a perspective view of another embodiment of the film carrier using two overlay leaves to cover the transparency from opposite sides, requiring no strips or tucking.

This disclosure is an illustration and not meant to indicate all the possible ways of automating the display of transparent viewable that proceed as natural variations on the apparatus and method herein described. For example, FIG. 8 describes an alternative method for loading film onto the film carrier. This method is also applicable for loading slides in a miniature scroll type arrangement for viewing on a projector adapted to use the advantageous features described herein. Such methods are contemplated by the inventor and are well within the scope of the invention as claimed hereinafter and its equivalents.

What is claimed is:

1. A conveniently demountable apparatus for use in conjunction with an overhead projector, for storing and automatically displaying overhead transparencies comprising:
   a. a web means having at least one transparent section thereon;
   b. means for holding at least one overhead transparency on said web means over said transparent section said means for holding comprising corner strip means for securing an overlay leaf;
   c. cassette means for positioning said web means in proper alignment over said overhead projector;
   d. means for driving said web means and said transparencies mounted thereon in said cassette means over the active projecting area of said overhead projector.

2. A conveniently demountable apparatus for use in conjunction with an overhead projector, for storing and automatically displaying overhead transparencies comprising:
   a. a web means having at least one transparent section thereon;
   b. means for holding at least one overhead transparency on said web means over said transparent section, said means for holding comprising dual overlay leaves;
   c. cassette means for positioning said web means in proper alignment over said overhead projector;
   d. means for driving said web means and said transparencies mounted thereon in said cassette means over the active projecting area of said overhead projector.

* * * * *